(12) United States Patent
Schinkel et al.

(10) Patent No.: US 6,725,254 B1
(45) Date of Patent: Apr. 20, 2004

(54) METHOD FOR CONTROLLING INFORMATION EXCHANGE VIA THE INTERNET

(75) Inventors: Fritz Schinkel, Unterhaching (DE); Michael Ahn, Weilheim (DE)

(73) Assignee: Fujitsu Siemens Computers GmbH, Munich (DE)

(*) Notice: Subject to any disclaimer, the term of this patent is extended or adjusted under 35 U.S.C. 154(b) by 0 days.

(21) Appl. No.: 09/285,613

(22) Filed: Apr. 2, 1999

(30) Foreign Application Priority Data

Apr. 2, 1998 (DE) .......................... 198 14 859

(51) Int. Cl.[7] .............................. G06F 15/16
(52) U.S. Cl. ................. 709/205; 709/203; 709/218
(58) Field of Search ................. 709/205, 228, 709/203, 217–219, 311

(56) References Cited

U.S. PATENT DOCUMENTS

| 5,455,948 | A | * | 10/1995 | Poole et al. ............... 707/102 |
| 5,572,724 | A | * | 11/1996 | Watanabe et al. ............ 707/200 |
| 5,701,451 | A | * | 12/1997 | Rogers et al. ................. 707/1 |
| 5,715,453 | A |   | 2/1998 | Stewart |
| 5,721,908 | A | * | 2/1998 | Lagarde et al. ............... 707/10 |
| 5,727,129 | A | * | 3/1998 | Barrett et al. ................ 706/10 |
| 5,732,219 | A |   | 3/1998 | Blumer et al. ............... 709/227 |
| 5,774,670 | A | * | 6/1998 | Montulli ..................... 709/227 |
| 6,012,083 | A | * | 1/2000 | Savitzky et al. ............ 709/202 |
| 6,327,598 | B1 | * | 12/2001 | Kelley et al. ............... 715/513 |
| 6,549,952 | B1 | * | 4/2003 | Plassman et al. ........... 709/311 |

FOREIGN PATENT DOCUMENTS

EP   0 812 088 A2   12/1997

OTHER PUBLICATIONS

Using the World Wide Web to provide a platform independent interface to high performance computing Robertson, D.W.; Johnston, W.E.; Compcon '95.'Technologies for the Information Superhighway', Digest of Papers., Mar. 5–9, 1995. Page(s): 3–7.*

(List continued on next page.)

Primary Examiner—Marc D. Thompson
Assistant Examiner—Douglas Blair
(74) Attorney, Agent, or Firm—Laurence A. Greenberg; Werner H. Stemer; Gregory L. Mayback (57) ABSTRACT

A method for controlling the information exchange between at least one central computer and a subscriber via a control system. Following a request from the subscriber, the control system receives the data relevant to the subscriber from the central computer in a first control phase. In a second control phase, information transmitted from the subscriber is processed and transmitted to the central computer. The first and the second control phases are defined by a single control program.

9 Claims, 8 Drawing Sheets

OTHER PUBLICATIONS

A distributed connection manager interface for web services on IBM SP systems Yew–Huey Liu; Dantzig, P.; Wu, C.E.; Ni, L.M.; Parallel and Distributed Systems, 1996. Proceedings., 1996 International Conference on , Jun. 3–6, Page(s): 2–9.*

Using the World Wide Web to provide a platform independent interface to high performance computing □□Robertson, D.W.; Johnston, W.E.; Compcon '95.'Technologies for the information Superhighway', Digest of Papers. , Mar. 5–9, 1995. Page(s): 3–7.*

A distributed connection manager interface for web services on IBM SP systems □□Yew–Huey Liu; Dantzig, P.; Wu, C.E.; Ni, L.M.; Parallel and Distributed Systems, 1996. Proceedings., 1996 International Conference on , Jun. 3–6, 1996 Page(s): 2–9.*

Web Transactions V4.0 Template Language Nov. 2000, Fujitsu Siemens Computers GmbH, 2000, Edition: Nov. 2000. (http://manuals.fujitsu–siemens.com/servers/man/man_us/appi_man/webtapdf/v4_0/wta_ts.pdf).*

International Publication No. WO 97/18635 (Peercy et al.), dated May 22, 1997.

* cited by examiner

METHOD FOR CONTROLLING INFORMATION EXCHANGE VIA THE INTERNET

BACKGROUND OF THE INVENTION

Field of the Invention

The invention relates to a method for controlling information exchange between at least one central computer and a subscriber via a control system. Following a request from the subscriber, the control system receives the data relevant to the subscriber from the central computer in a first control phase, prepares and transmits the data to the subscriber, and in a second control phase also processes information consequently received from the subscriber and transmits it to the central computer.

Nowadays exchanging information between computers no longer presents a problem, provided that the exchange is performed using a set of fixed rules. A set of rules of this type is also referred to as a "protocol". An example of such a protocol is the "Internet Protocol". However, a protocol such as this does not suffice if information is to be exchanged not between two computers, but between a user and a computer. The information must be presented to the user in such a way that it can be entered and also amended if necessary. In the prior art the so-called "client/server model" is used for this purpose. With this method a computer, the "server", makes functions available that a user at a different computer, the "client", can use.

The exchange of information with a database managed by a central computer may serve as an example of the application of such a method. If the user requires information from the database, a connection is established between the two computers, so that the information can be transported to the user's computer. The client must present the information to the user in such a way that the user can work with it. If necessary, information amended by the user must be transmitted back to the central computer again. The method assumes that compatible versions of the relevant programs are available on both computers. If the user wishes to access several databases, a separate program that prepares the information is required on the user's computer for each database.

This requirement can be satisfied if the central computer or central computers determine the presentation of the information and use the same method for it. One instruction set suitable for this purpose is HTML (Hyper Text Markup Language). The instruction set is a defined group of instructions that determine the appearance of screen pages. Using the instruction set, the central computer describes how the information is to appear to the user and transmits the instructions to the computer at which the user is working. A program on the computer must ensure the correct conversion of the instructions. If all central computers use the same instructions for presenting their information, the user also requires only one program to be able to exchange information with all central computers or databases.

The known solution has the following disadvantage: the central computer must perform two additional tasks when preparing the data and evaluating the inputs made by the user, for which the programs that run on the computer must be extended. Moreover, it has to make resources, such as computing capacity and memory space for example, available to process the tasks. This can be avoided if the user no longer establishes the connection directly to the central computer, but rather to a control system located between the user and the central computer. The control system controls the information exchange between the user and the central computer and performs the task of preparing the information.

The control system must therefore be able to communicate both with the user and with the central computer. In addition to the preparation of the information to be sent to the user, communication with the user necessitates the evaluation of information coming from the user. There must however be a way of describing the flow of such an information exchange that includes the above-mentioned aspects. It must be possible to program the control system with the aid of this description.

A method known as "server side scripting" is used for programming the control system. The method is characterized by the fact that, in a program with which the structure by the face a screen page is described, it is possible to define program sections which are executed by the control system before the page is transmitted to the user. Using the instructions, the program sections containing it is possible, for example, to send information to the central computer or for the latter to request information. Information sent to the central computer originates from inputs the user made in previously processed screen pages. The information requested by the central computer can be prepared in the new page to be displayed. The program for screen generation ends with the transmission of the page to the user.

The problem of the known method is that the instructions the control system executes are always processed before the screen page is sent to the user. The inputs of the user, however, only arrive at the control system at a time when the program that built the page has already terminated. With the prior art, therefore, the processing of user inputs in the control system must be handled by another program. The building of a screen page takes place in a first control phase, and the processing of the inputs from the user in a second control phase. With the method, the control system requires a separate program for each control phase. Accordingly, in the prior art it is necessary to provide and maintain a plurality of programs and load and start them at different times. This requires an increased outlay, in particular also a high outlay for program development and program maintenance.

SUMMARY OF THE INVENTION

It is accordingly an object of the invention to provide a method for controlling information exchange via the Internet that overcomes the above-mentioned disadvantages of the prior art methods of this general type, in which no additional programs are required for processing information.

With the foregoing and other objects in view there is provided, in accordance with the invention, an improved method for controlling an information exchange between at least one central computer and a subscriber via a control system, the improvement which includes: transmitting data relevant to the subscriber from the at least one central computer to the control system during a first control phase following a request from the subscriber; preparing and transmitting the data to the subscriber from the control system; and processing, during a second control phase, information subsequently received from the subscriber in the control system, and transmitting the information from the control system to the at least one central computer, the first control phase and the second control phase defined by a single control program.

With the method according to the invention, both the first control phase and the second control phase are defined by a single control program for the control system. In the first control phase, following a request from a subscriber, for example a user at a terminal, the control system receives the data relevant to the subscriber from the computer, for example from a central computer, prepares the data and transmits it to the subscriber. In the second control phase, the control system processes the information received from the subscriber and transmits it to the central computer. Execution of the control program is halted for the time the subscriber requires to process the information sent to him.

As a result of the invention, once it has detected the request from the subscriber, the control system can select the associated control program required to process the request. This consequently dispenses with, for example, subsequent accesses to the storage medium on which all control programs are located. In the case of the invention, the control program selected in each case is relatively large, since the commands for generating the second control phase, which hitherto had to be held in an additional program, are now included in the control program itself. The invention is based however on the finding that loading a longer program is more favorable than loading an additional program. Before the additional program(s) is (are) loaded, it is namely first of all necessary to determine the address at which the additional program has been stored on the storage medium. Moreover, the management and maintenance of such additional programs entail a high outlay.

The information exchange performed in the context of the invention serves as the starting point for the development of complex dialogs between the subscriber and the computer. Such a dialog may be thought of as a concatenation of a number of processes to exchange information such as was described above. Each individual exchange process is processed fully by one control program. This does not preclude a control program using information obtained from one of the previous control programs. The invention facilitates a development of dialogs between a subscriber and a computer in as much as the information flow between the individual control programs is reduced. A control program only needs to accept the information it requires for processing its information exchange. It may therefore be sensible to extend the method according to the invention so that more than two control phases can be generated by a control program.

A preferred further development of the method enables information to be transmitted to the computer in the first control phase.

Another preferred further development of the method enables the control system to receive information from the computer in the second control phase as well. The information may be information required for processing the user inputs.

It is advantageous to extend the control system in such a way that it can read control programs from the memory that contain the control programs without executing them. The method according to the invention can consequently be used to display existing control programs.

It is furthermore sensible to extend the control system in such a way that it can write data into the memory containing the control programs. The method described can consequently also be used to maintain existing control programs and to create new control programs. The further development additionally enables methods for automatic generation of control programs to be used. Using such methods it is possible to create control programs that function in accordance with the method according to the invention for already existing dialog systems.

The use of symbols by which the sections in the control program to be executed in the first or second control phase respectively are especially marked is suitable for the application of the method. In this case, different symbols should be allocated to the two control phases. For example, the symbol "wtOnCreateScript" could be used to mark the section containing commands for the first control phase, and the symbol "wtOnReceiveScript" could be used for the section with commands for the second control phase. These two symbols are used in the instruction set of the known "WebTransaction Markup Language" language.

For marking the end of such a section, four possible embodiments are described below: in a first embodiment, one of the symbols just described instructs the control system to execute only the command immediately following the symbol in the respective control phase. In this way, such a symbol would apply to one command only in each case.

In a second embodiment, the same symbol that marks the beginning of the section is used to close the section. In a third embodiment, a further symbol is defined with which the last section started is closed.

In a fourth embodiment, a separate symbol with which the section is closed is defined for each symbol with which a section is started. Two further symbols must then be defined.

All four embodiments mentioned allow a plurality of sections to be defined in the control program with commands to be executed in a control phase.

In a further development of the second and fourth embodiments, it is permissible for a section with commands for the one control phase also to contain, wholly or in part, a section with commands for the other control phase.

As a further development of the second and fourth embodiments, it is additionally possible for the commands belonging to the subsection set of the two sections also to be executed in both control phases.

In a further development of the third embodiment, it is permissible for a section with commands for the one control phase also to contain a section with commands for the other control phase.

It may furthermore be advantageous also to swap out program sections into separate files in the memory containing the control programs. It is then possible to reference the program sections in the control program. The control system must also take account of the swapped-out program section when loading the control program. Proceeding in this way reduces the storage space required in the memory containing all the control programs and facilitates maintenance of the control programs.

Other features which are considered as characteristic for the invention are set forth in the appended claims.

Although the invention is illustrated and described herein as embodied in a method for controlling information exchange via the Internet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a control system for the known Internet. The data exchange between an Internet user and a central system is controlled using the control system. A query is sent to the control system via an Internet connection 10. As is known, a unique address in the Internet is assigned to every query to which the control system is able to respond. The address is known as the Uniform Resource Locator, referred to below as URL. Access to these addresses is preferably by a browser. As is known, a browser is a program that loads screen pages via the Internet connection 10 and displays them on a monitor. The screen pages are characterized in that they may contain links to other screen pages. If a subscriber selects a link, the browser loads the respective screen page and displays it on the monitor.

Figure 1:
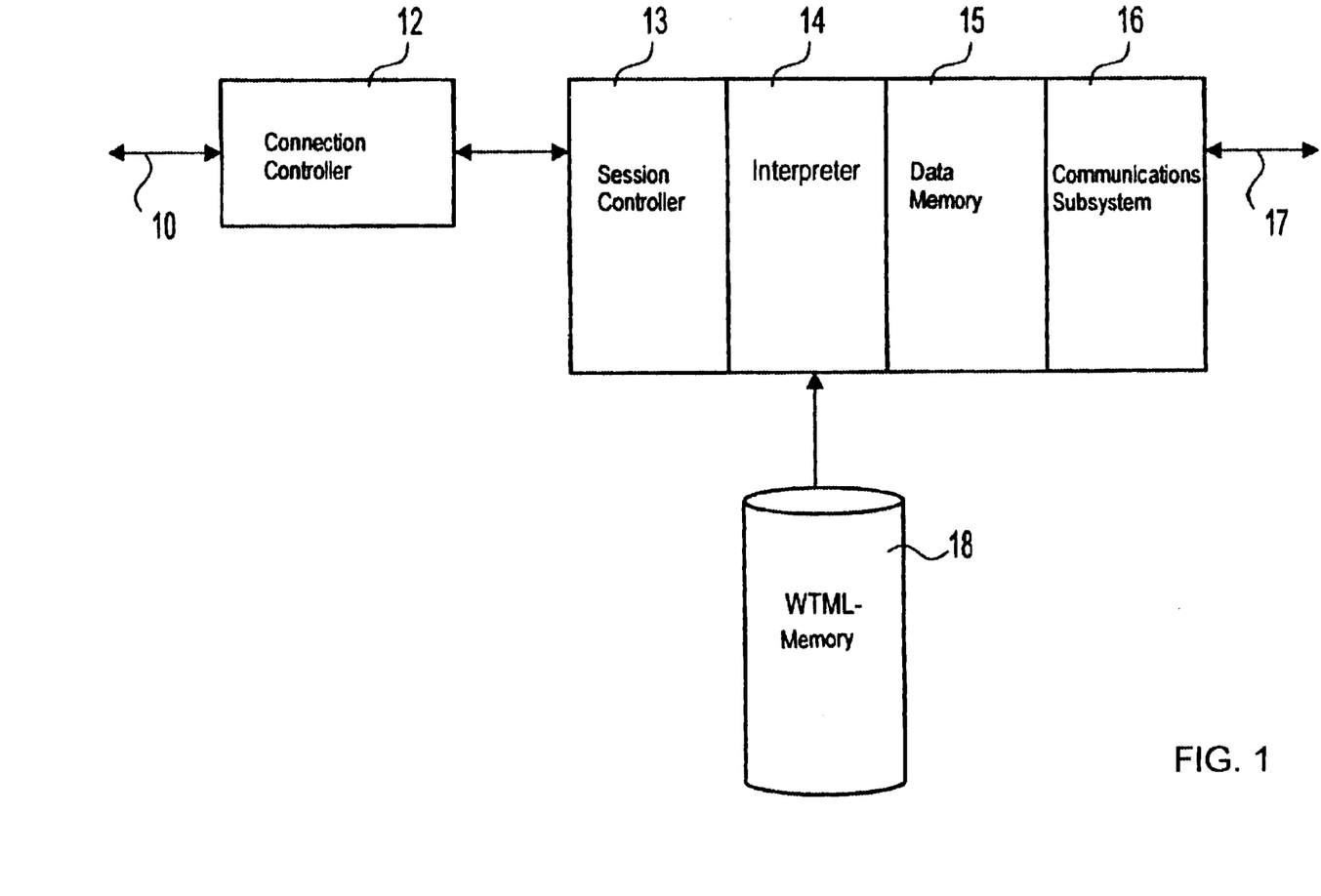
FIG. 1 is a diagrammatic block circuit diagram of a control system according to the invention.

A connection controller 12 monitors the connection 10 to the Internet. It detects whether the subscriber has selected a URL associated with a query, and identifies the query. There is a control program, also termed a template, for each query that describes how the query must be responded to. All control programs are stored in a memory 18. The connection controller 12 instructs an interpreter 14 to load the control program associated with the submitted query from the memory 18 and execute it.

The WebTransaction Markup Language, referred to below as WTML, instruction set is preferably used for the control programs. The instruction set offers the ability to switch between three different modes with the aid of escape symbols. An escape symbol is a control character for the interpreter 14.

A first, on the whole conventional, program mode causes the interpreter 14 to consider a section of the source text of the control program which is marked by escape symbols as the program section it must process directly. The interpreter 14 immediately executes, for example, a read instruction with which the contents of a memory address are determined. The program section is thus executed in the first control phase.

In a second program mode, the interpreter 14 is likewise instructed to consider a section of the source text of the control program marked by the escape symbols as a program section. However, the program section must not be executed until after a reply has been received from the browser. The program section is thus processed in the second control phase.

All other sections of the source text of the control program are sent by the interpreter 14 to the browser once the entire source text of the control program has been processed. A data store 15 enables sections of the source text that are not to be executed or sent to the browser until a later point to be stored.

Also provided are a session controller 13 and a communications subsystem 16 that support the interpreter 14 when it communicates with a central computer 25 (FIG. 2) via a connection 17.

Figure 2:
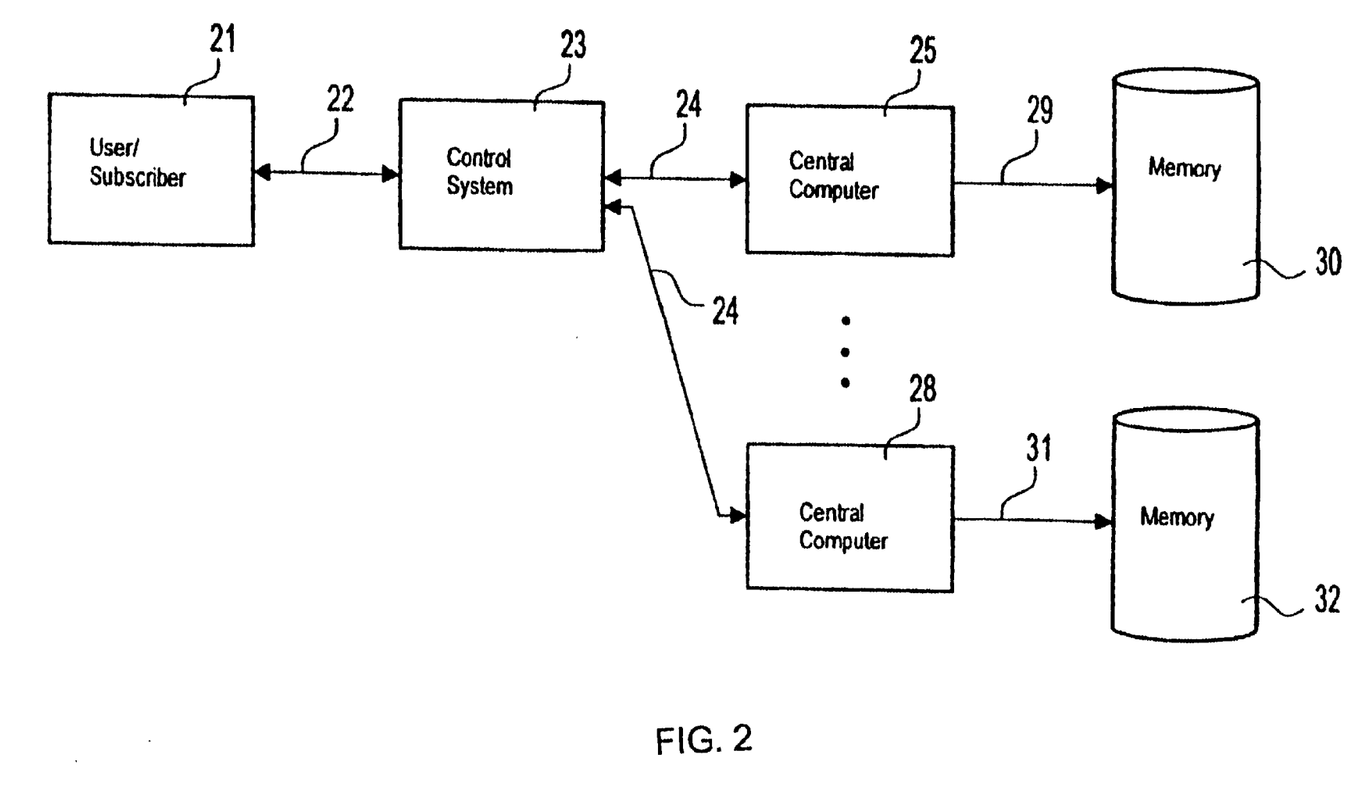
FIG. 2 is a block circuit diagram of a booking system.

FIG. 2 schematically illustrates the structure of a booking system as an example of the application of the invention. A user 21 submits a query to the booking system. For this a connection 22 must be established between the user 21 and the control system 23 of the booking system. The control system 23 has the structure illustrated in FIG. 1. The connection 22 is established via the Internet or an intranet. An intranet is a computer network that functions in the same way as the Internet. Access to the computer network is however restricted to a specific group of people, for example the employees of one company.

The control system 23 of the booking system accepts the incoming query of the user and identifies it. The type of query and how it is to be answered emerge from the information exchange between the user 21 and the booking system that has taken place up until this point in time. On the basis of the information, the control system 23 selects from the memory 18 the control program that describes the information exchange required for processing the query.

The control program defines the screen page of a monitor that will next appear to the user 21. The control program also defines whether it is necessary to request data from a central computer 25 to build the screen page. Via a connection 29, the central computer 25 has access to a memory 30 containing the data to which the query of the user 21 relates. If necessary, a connection 24 must be established between the control system 23 and the central computer 25, which connection may be led via a LAN (Local Area Network) for example. In this case it may be necessary to establish connections to further central computers 28 which have access to a memory 32 via a connection 31.

Once all the information necessary for building the screen page is available to the control system 23, it sends the description of the screen page to the user via the connection 22. The screen page may be, for example, a form requesting the user to input data. Once the user 21 has finished editing the screen page, his inputs are transmitted to the control system 23. The inputs of the user 21 must be evaluated with the aid of the control program that defines the information exchange. The control program also defines what information needs to be transmitted to the central computer(s) 25 to 28. After this, the information exchange has been completed and the control program has been processed.

Figure 3:
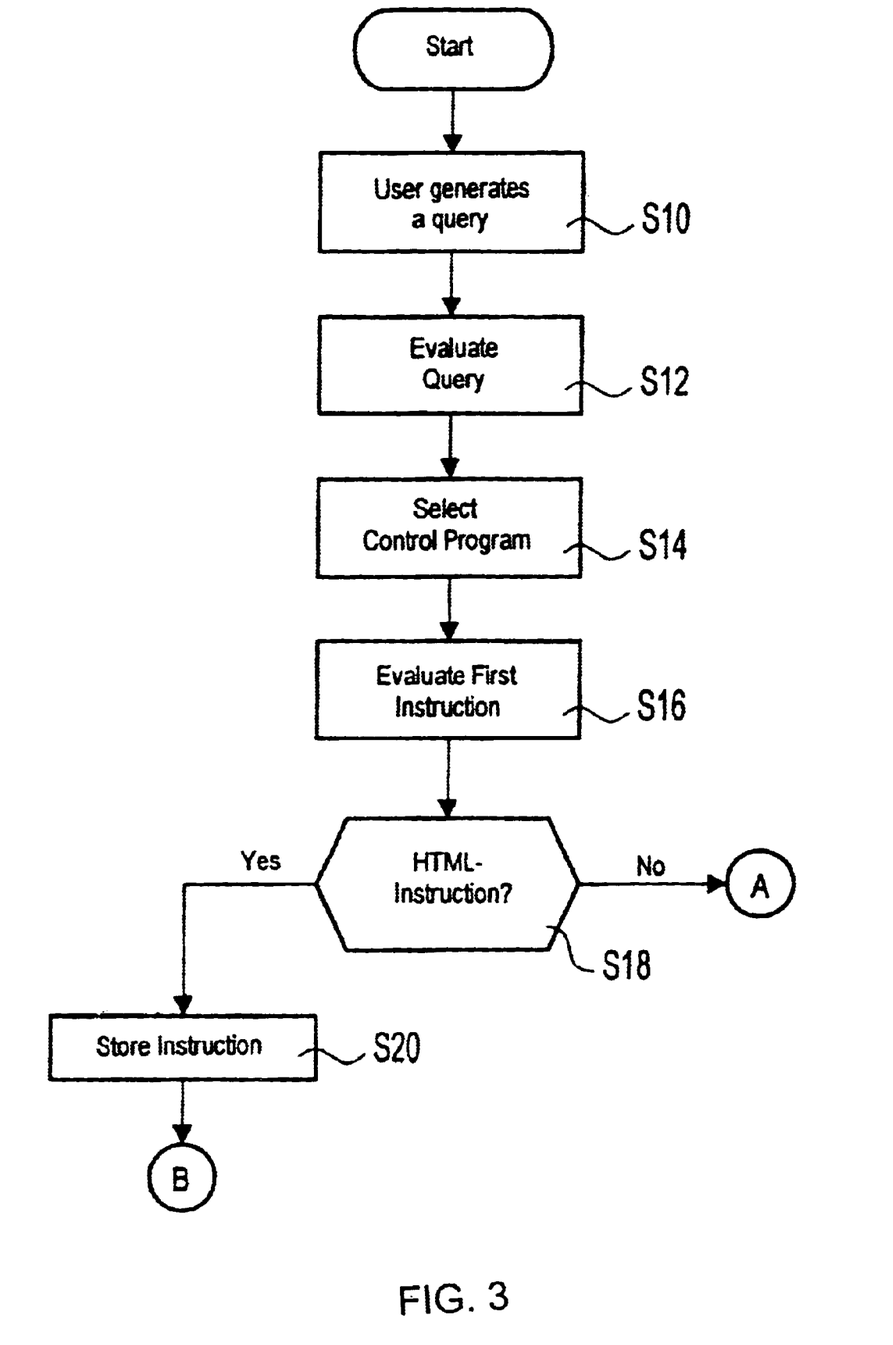
FIG. 3 is a flow chart of a sequence of process steps up until evaluation of a first line of a control program.

FIG. 3 shows a flowchart for the information exchange between the user 21 and the central computer 25 for evaluating the first instruction of the control program.

The information exchange is started in process step S10 in that the user 21 selects/generates a query to the communications system. The query may emerge, for example, from a previous information exchange between the user 21 and the central computer 25. In step S12, the control system 23 accepts the query and evaluates it. While doing so, the control system 23 may possibly need to take account of information obtained from the dialog that has already taken place between the user 21 and the central computer 25. The evaluation of the query of the user 21 leads in step S14 to the control system 23 selecting the control program required to process the query. The first control phase of the communications controller begins with the step S14.

Evaluation of the control program by the control system 23 begins with step S16. The control system 23 proceeds here instruction-by-instruction and checks whether the instruction read in is an HTML instruction, an instruction for the first control phase or an instruction for the second control phase. If the query S18 establishes that the instruction read in is an HTML instruction, the control system 23 must store it (step S20). If the answer to the query S18 is negative, a branch is made to A and a check is performed with query S60 (see FIG. 7) as to whether the instruction is an escape symbol that marks a beginning of the section containing commands to be executed in the first control phase.

Figure 4:
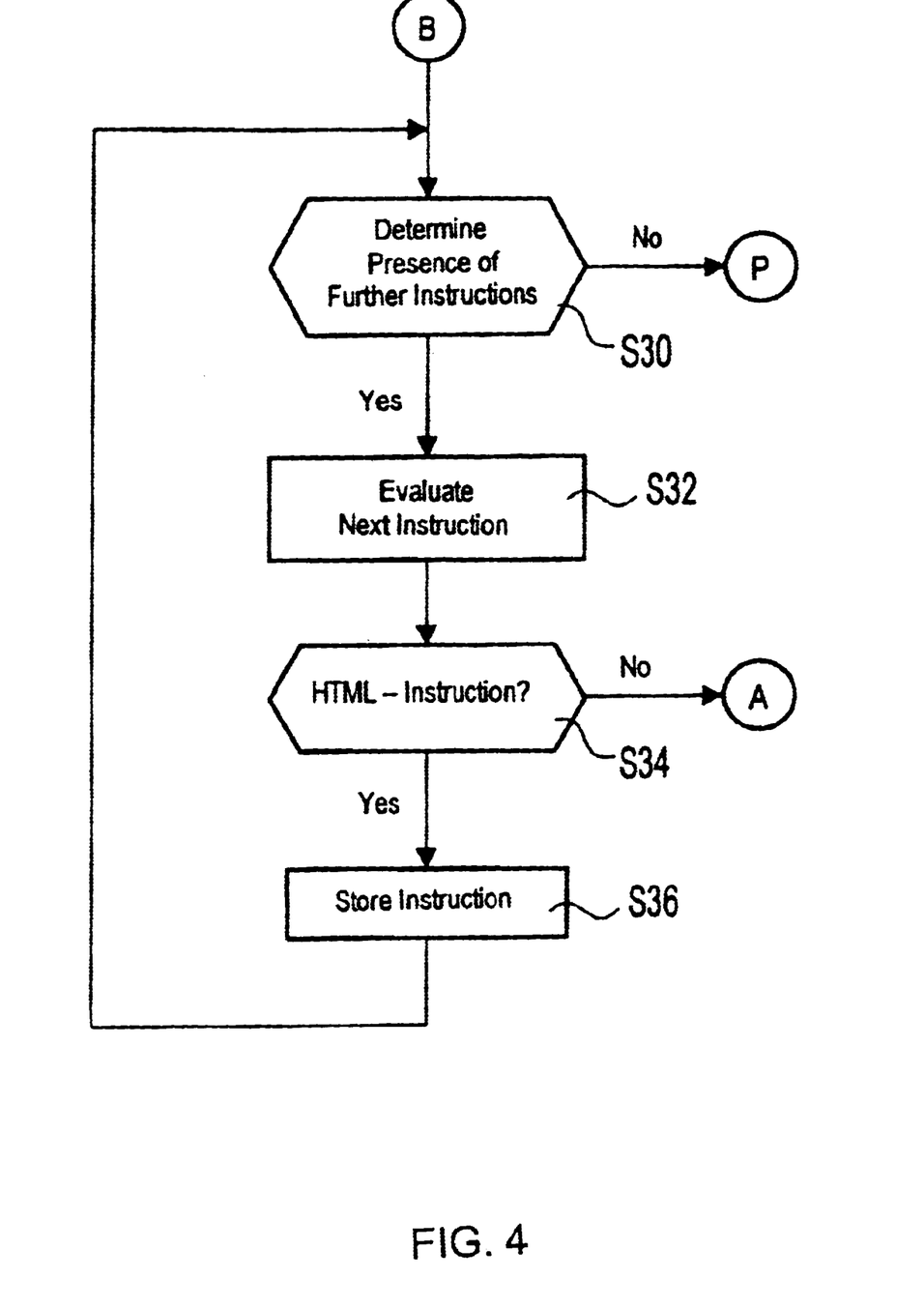
FIG. 4 is a flow chart of a program loop in which all further lines of the control program are evaluated.

FIG. 4 shows a program loop in which all further instructions of the control program are evaluated. The program loop initiated by a query S30 is run for each instruction of the control program. If it emerges from the query S30 that the control program contains another instruction, the latter is evaluated (step S32) and it is checked whether the instruction is an HTML instruction (query S34). If the query S34 has a positive result, the control system 23 must store the HTML instruction (step S36).

Figure 5:
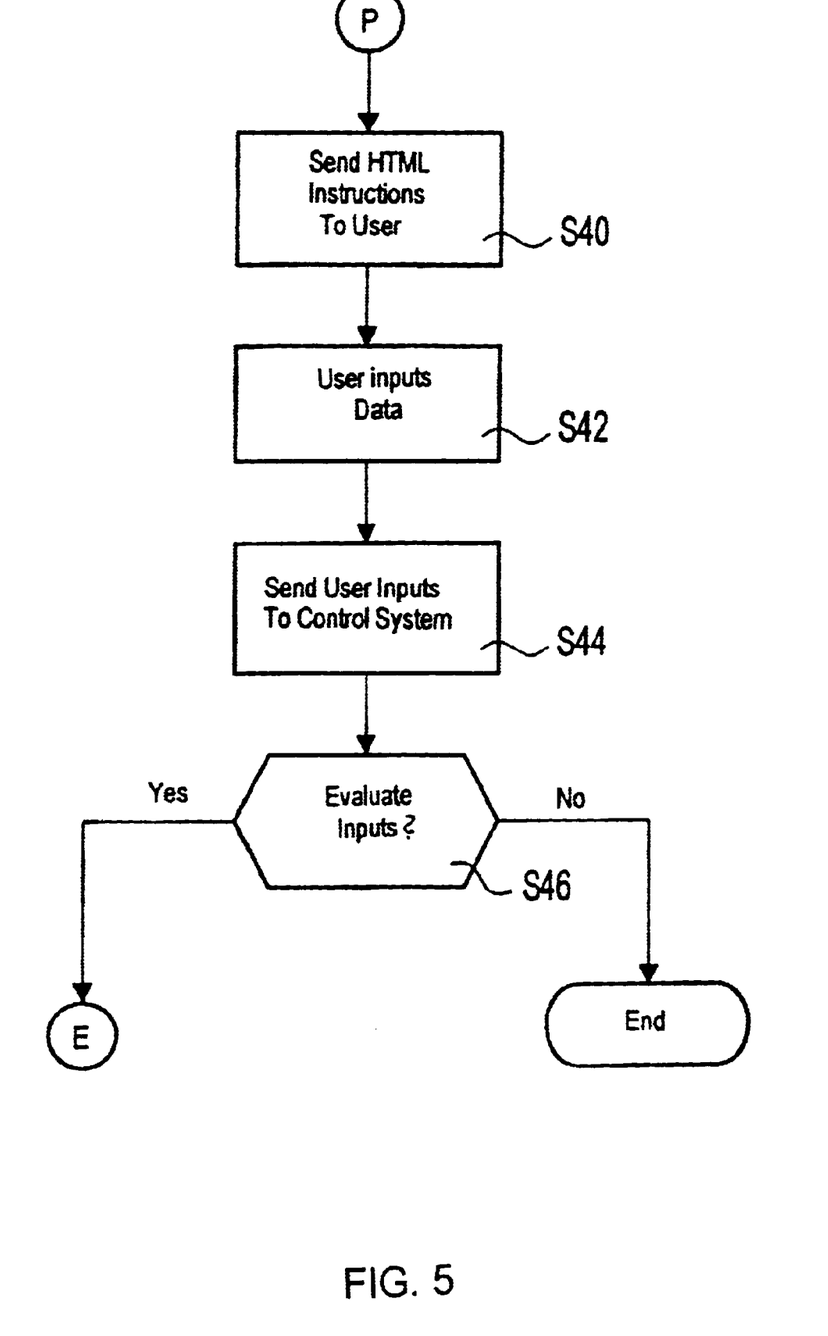
FIG. 5 is a flow chart of a continuation of the sequence of information exchange up until a query as to whether user inputs are to be processed.

FIG. 5 shows the further sequence of information exchange up until the query as to whether user inputs are to be processed. In sequence step S40 the control system 23 transmits to the user 21 all instructions required for building a screen page at the user 21. The screen page may be, for example, a form into which the user 21 in turn must input data. This completes the first control phase. Execution of the control program is now interrupted by the control system 23.

Once the user 21 has finished editing the screen mask (step S42), the user inputs are transmitted to the control system 23 in process step S44. The second control phase begins with this step.

The control system 23 now continues processing the control program and checks in query S46 whether the control program contains instructions for processing the received information. If this is not the case, the information exchange is complete at this point.

Figure 6:
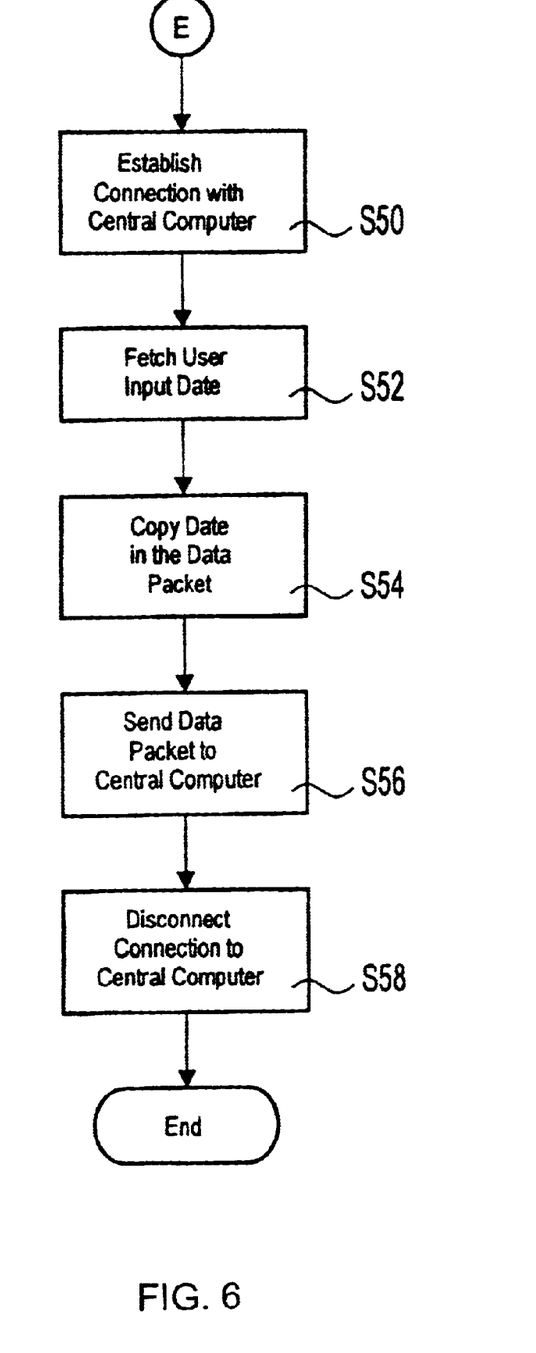
FIG. 6 is a flow chart of an example of an instruction sequence executed in a second control phase.

FIG. 6 shows a simple example of an instruction sequence with which an input of the user 21 is sent to the central computer 25 in the second control phase. A connection is established between the control system 23 and the central computer 25 in step S50. This step may be omitted if such a connection already exists.

A date input by the user 21, which is stored under the symbolic address DATE, is fetched (step S52). In step S54, the value at position DATE is written into the data packet that is to be sent to the central computer 25. A data packet of this type may hold a plurality of such values. The important point is that the central computer 25 knows how this data packet is structured, that is to say which positions exist in such a data packet.

The data packet is transmitted to the central computer 25 in process step S56. The connection to the central computer 25 is cleared again in step S58. This completes the second control phase. Step S58 may be omitted if it is already clear at this point that further data will need to be exchanged between the user 21 and the central computer 25 or between the control system 23 and the central computer 25. This completes the information exchange.

Figure 7:
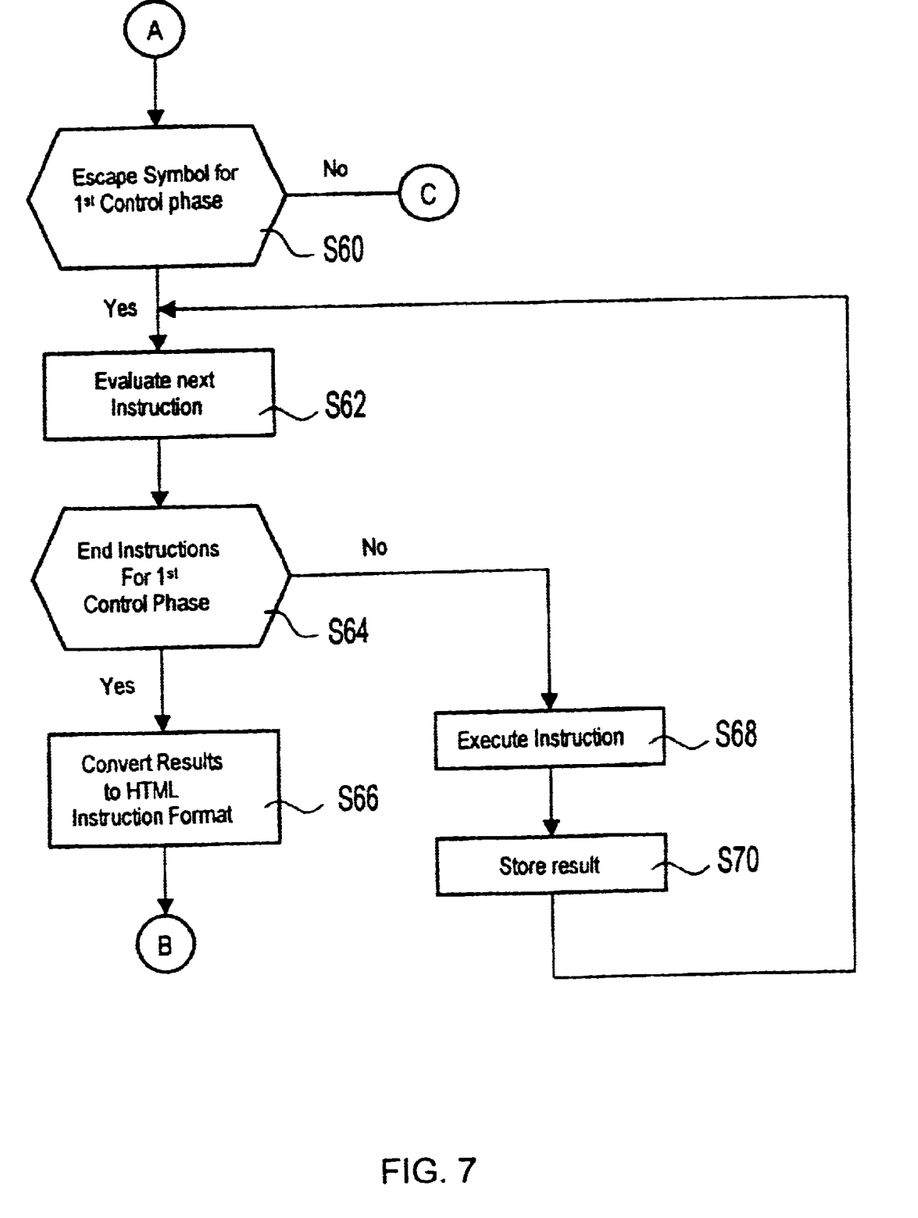
FIG. 7 is a flow chart of an evaluation of the instructions for the first control phase.

FIG. 7 shows the evaluation of instructions of the control program to be executed in the first control phase. If queries S18 or S34 have established that the instruction to be evaluated is not an HTML instruction, in query S60 it is checked whether the instruction to be evaluated introduces the program section which must be executed in the first control phase. If this is the case, the next instruction can be evaluated (step S62).

Provided that the program section is not ended (query S64), the instruction is executed (step S68). The instruction may be, for example, a query to the central computer 25. In this case the control system 23 must store the result of the query (step S70).

Once the last instruction in this program section has been executed, with the aid of the HTML instructions the results must be prepared and linked to the stored HTML instructions (step S66).

Figure 8:
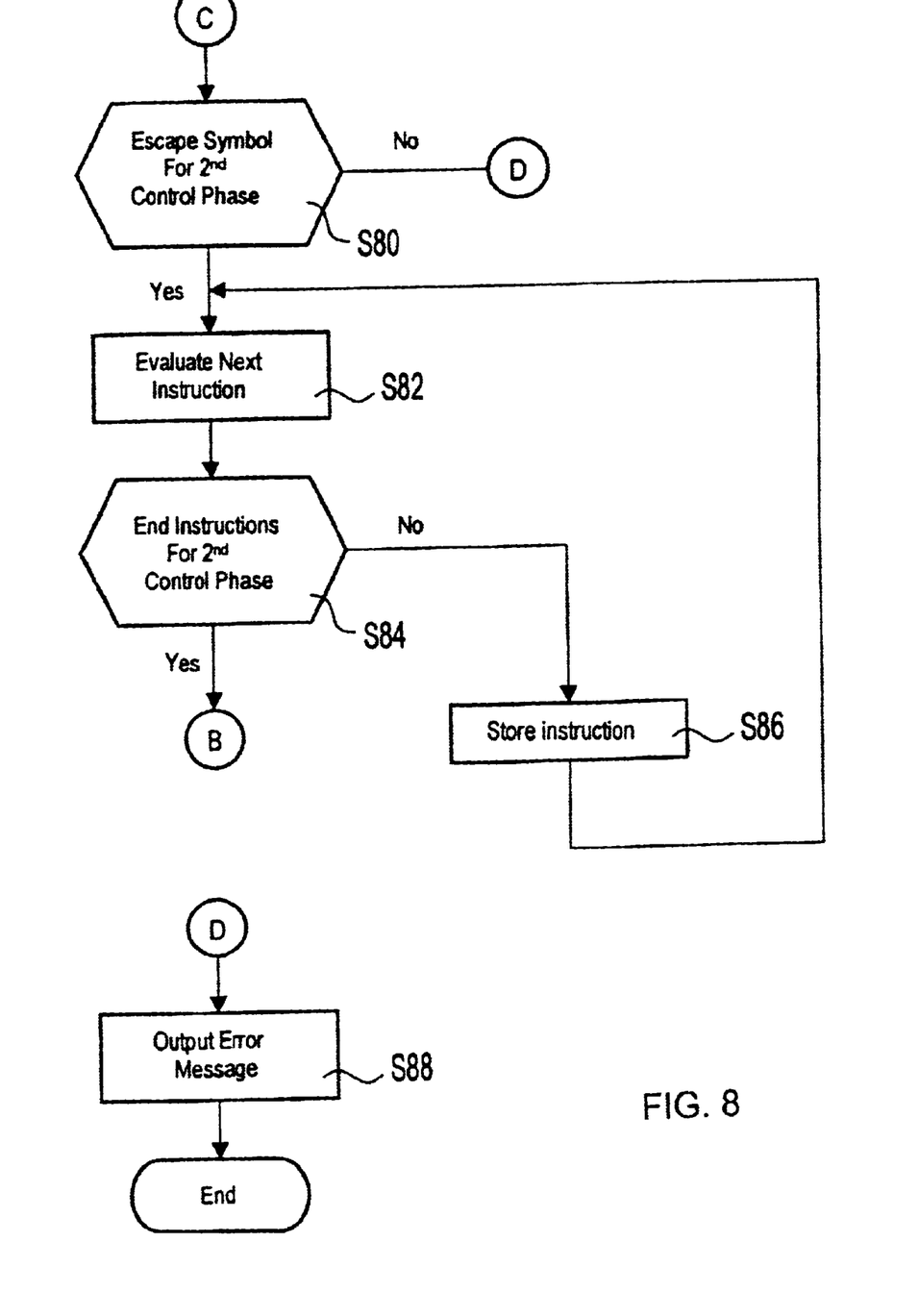
FIG. 8 is a flow chart of the evaluation of the instructions for the second control phase.

FIG. 8 shows the evaluation of instructions of the control program which must be executed in the second control phase. If the query in step S60 has a negative result, the instruction read in must be an instruction with which the program section containing commands for the second control phase is started. If the query S80 also has a negative result, in step S88 the control system 23 outputs an error message and aborts processing of the control program.

The next instruction of the control program is read in with step S82. Provided that the query S84 does not establish that the program section is ended, the control system 23 must store (step S86) the instruction read in until the answer from the user has arrived and is to be processed (see query S46 in FIG. 5).

We claim:

1. An improved method for controlling an information exchange between at least one central computer and a subscriber via a control system, the improvement which comprises:

transmitting data relevant to the subscriber from the at least one central computer to the control system during a first control phase following a request from the subscriber;

preparing and transmitting the data to the subscriber from the control system;

processing, during a second control phase, information subsequently received from the subscriber in the control system, and transmitting the information from the control system to the at least bne central computer, the first control phase and the second control phase defined by a single control program; and providing the control program with symbols indicating sections allocated to one of the first control phase and the second control phase; and providing the control program with an instruction set of a WebTransaction Markup Language.

2. The method according to claim 1, which comprises using a server side scripting method for programming the control system.

3. The method according to claim 1, which comprises using an HTML instruction set in the control program.

4. The method according to claim 1, which comprises transmitting further information to the at least one central computer in the first control phase.

5. The method according to claim 1, which comprises transmitting further information from the at least one central computer to the control system in the second control phase.

6. The method according to claim 1, which comprises reading, via the control system, a respective control program out of a memory without executing the respective control program.

7. The method according to claim 1, which comprises storing, via the control system, the data in a memory that also contains control programs.

8. The method according to claim 1, which comprises dividing the control program into program sections stored as files in a memory containing control programs.

9. The method according to claim 1, which comprises connecting the subscriber to the control system via one of an Internet and an intranet.

* * * * *